UNITED STATES PATENT OFFICE.

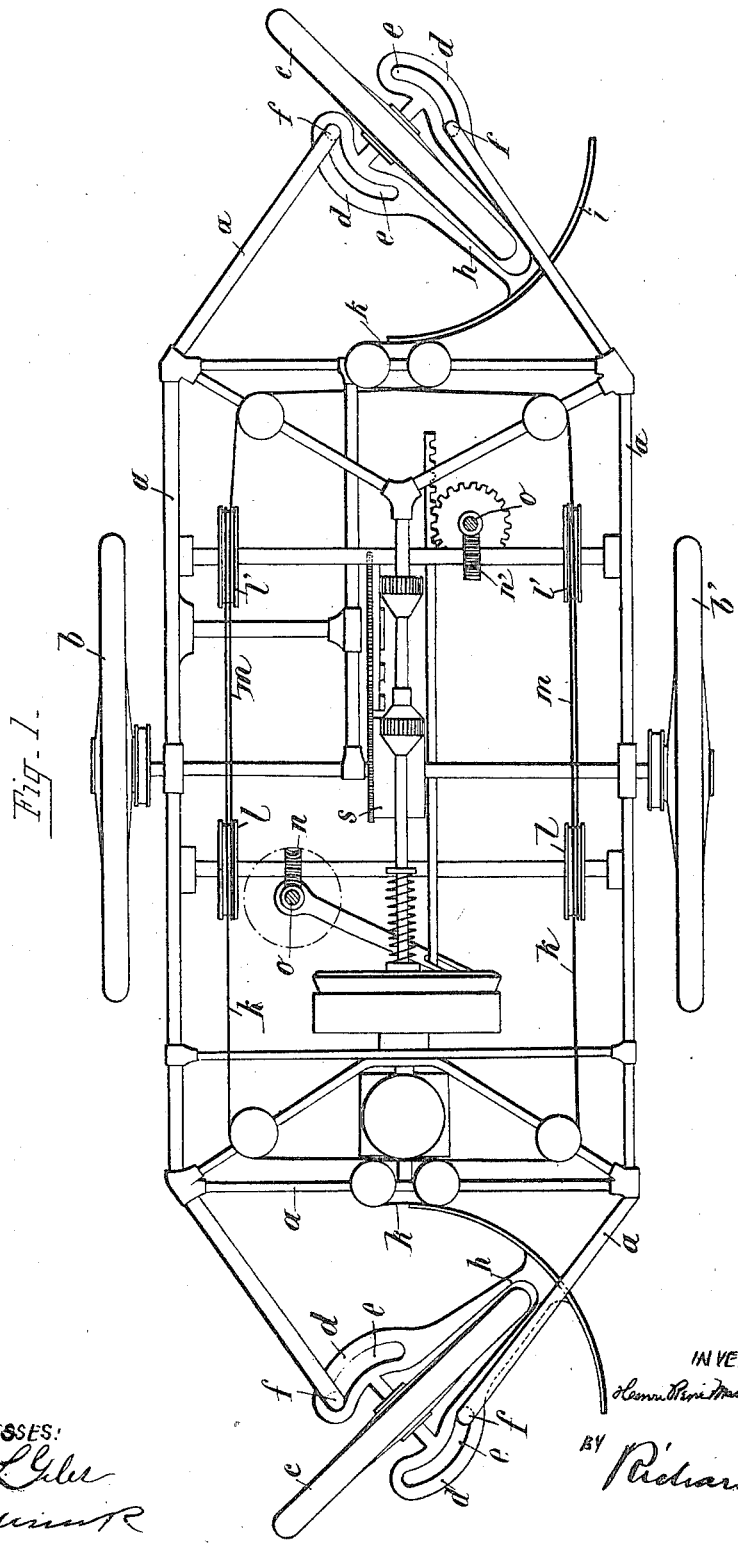

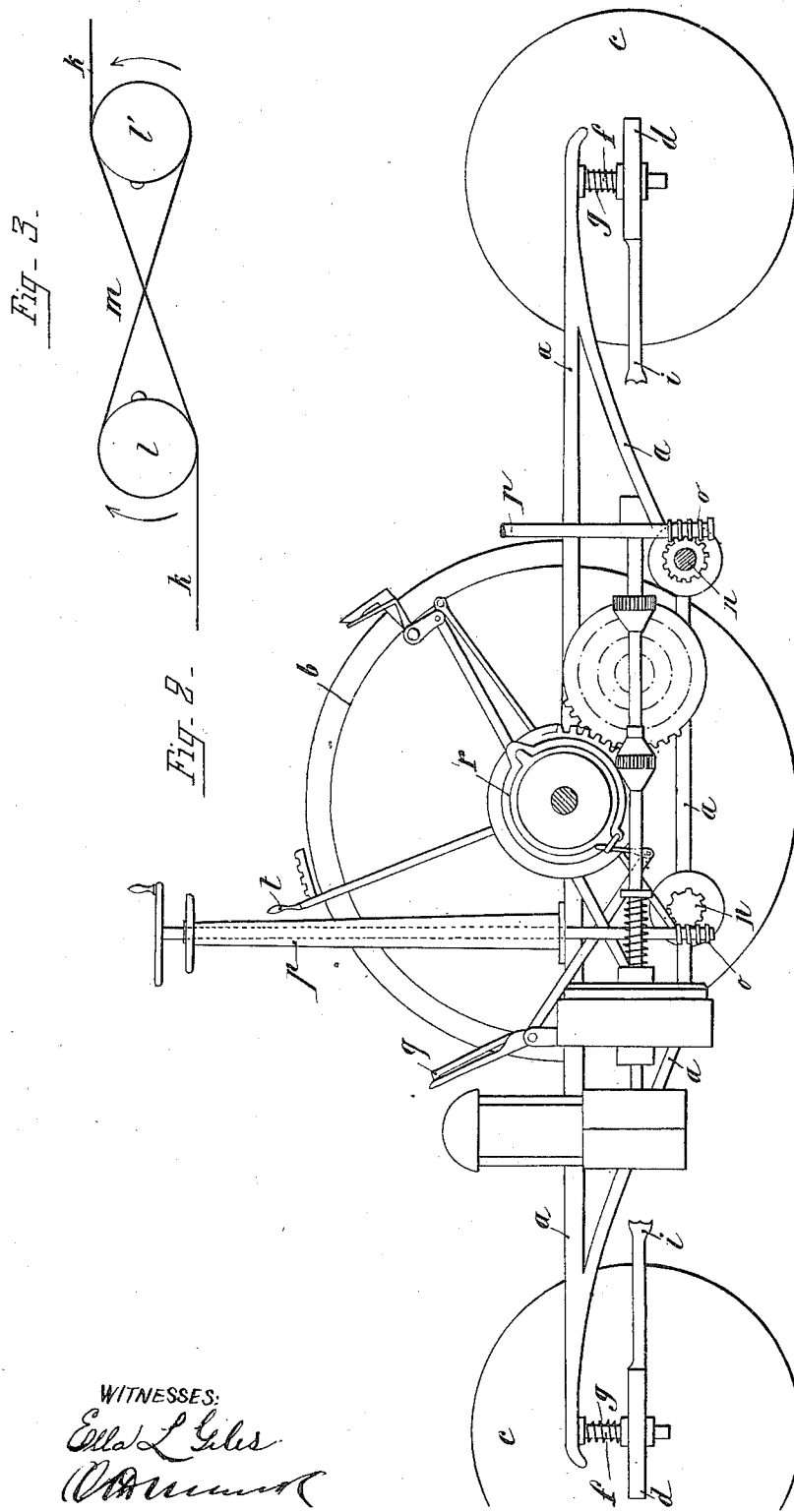

HENRY RENÉ MARIE CORMERY, OF BAUGÉ, FRANCE.

STEERING-GEAR FOR MOTOR-VEHICLES.

SPECIFICATION forming part of Letters Patent No. 680,764, dated August 20, 1901.

Application filed March 16, 1901. Serial No. 51,434. (No model.)

*To all whom it may concern:*

Be it known that I, HENRY RENÉ MARIE CORMERY, engineer, of the city of Baugé, (Maine-et-Loire,) Republic of France, have invented Improvements in Steering-Gear for Motor-Vehicles, of which the following is a full, clear, and exact description.

My invention has for its object an improved front and rear diagonal conjugate steering-gear for mechanical motor-vehicles.

My improved arrangement is more appropriate to automobile locomotion than vehicles mounted on four wheels, forming a regular rectangle, which is a rational arrangement when a draft-animal or locomotive-vehicle coupled in front is employed, but ceases to be so when the motor forms a part thereof.

The accompanying drawings show, by way of example only, a motor-car having my improved steering-gear applied thereto.

Figure 1 is a plan view. Fig. 2 is an elevation, and Fig. 3 shows separately the method of mounting the chains.

$a$ is a frame constructed of tubes, angle-iron, or other profile iron having the form of a quadrilateral terminated by two approximately equilateral triangles. The said frame rests on four wheels of different dimensions arranged in pairs, the driving-wheels $b$ being of larger diameter and the steering-wheels $c$ of less diameter and similar to each other. At their points of contact with the ground these wheels together form a perfect lozenge, of which the longer axis is substantially double the length of the shorter. In the example given the driving-wheels have, for example, a gage of one meter, (ten centimeters,) and the steering-wheels touch the ground at points two meters (twenty centimeters) from each other. The two steering-wheels are so connected together that they turn, when steering, through equal angles in opposite directions and in the movement of the vehicle describe a large curve, while the inner driving-wheel describes a curve of lesser radius. To effect this object, the arrangement employed is the following: The axle of each of the steering-wheels is mounted by screwing in two semicircular slides $d$, each formed with a slot $e$. These slides, with the slots in the middle, allow a pin or tenon $f$, forming part of the frame, to pass through them, and a suitable spiral spring $g$, surrounding this pin or tenon, deadens the vibrations between the said slide and the frame. At the ends thereof nearest the vehicle these two steering-slides are connected together by a horizontal fork $h$, which bears at its end a quadrantal sector $i$, which is recessed so as to form a double groove for receiving steering-chains $k$. By the displacement of this fork from the right to the left the wheel is caused to describe a semirevolution about its virtual center, being guided by the arc-shaped guides in the fixed tenons of the frame.

The controlling-chains of the whole system are mounted on two pairs of drums $l$ $l'$, the rotation of which in opposite directions is effected by crossed chains $m$, so that the winding in and unwinding are effected simultaneously by the front and rear sectors, (in the right side of the system looking from the front.) At the left side the first drum $l$ is fixed to the shaft in such a manner as to turn in the same direction therewith; but on this drum the chain is attached in such a manner as to leave it tangentially beneath. From this fact for a similar direction of rotation of the shaft a winding up to the right and an unwinding to the left are produced. The second drum $l'$ is mounted loosely on its shaft and its rotation in the opposite direction is obtained by the crossed chain, which passes over its double groove, Fig. 3. The winding up and unwinding of the chain are effected automatically, the winding up of one being right-handed and that of the other left-handed.

The drums $l$, over which the chain is wound, are keyed on the same shaft as a gear-wheel $n$, with large teeth controlled by a worm $o$ on a steering column or shaft $p$, from which it results that this steering is not reversible by blows or shocks received by the steering-wheels. It is obvious that compensating springs of a strength of about one hundred and twenty kilograms suitably arranged between the grooved sectors and the drum over which the chain is wound impart a certain elasticity to the chain, so as to prevent breakage of the gearing of the drums against the steering-worm. These springs are not shown in the drawings. In the example here shown I will remark that the steering-column (which also bears the speed-changing and reversing mechanisms) can be displaced and brought to the higher rear seat by simply unscrewing the nuts fixing its base to the body of the vehicle, which permits the driver to occupy, as required, the right-hand seat in front or the rear set, like the driver of a hansom-cab. In Fig. 1 in order to facilitate the comprehension of the drawings the shaft of this second steering-shaft has been shown outside the central axis traversing the vehicle along its greatest length; but in reality it is placed exactly in the middle of the vehicle above the said major axis. The foot-levers $q$ for the clutch and for the brake are also controlled either from the front seat or from the rear seat, as desired, and I will remark here that the clutch can always operate alone, while the foot-lever controlling the brake before acting always commences by carrying with it the clutch-lever, its extremity being on the left-hand side provided with a lateral arm resting on the said clutch-lever. This foot-lever controls the brake arranged on the differential gear $s$, while a lever $t$, located on the right-hand side of the figure, actuates the band-brakes on the driving-wheels, as can be seen on the plan.

I have also shown for the sake of completeness a speed-changing mechanism and a reversing-gear comprising a disk or plate which is always in engagement by means of its external teeth with the differential gear and is provided on its lateral face with four rings of teeth. These rings of teeth can be successively brought into engagement with two toothed pinions mounted to slide on a square horizontal shaft extending from the cone of the friction-clutch. A movable fork connected to the change-speed pillar controls both in such a manner that when the pinion for forward motion has left the large ring of the disk or plate (that for the low speed eight kilometers per hour) the pinion for backward motion comes into engagement with the same ring on the opposite side; but I repeat this speed-changing mechanism is only indicated here to complete the figure. I can employ any speed-changing mechanism comprising tooth-gearing, bevel-pinions, &c. The two horizontal bars of the frame are united by cross-bars of iron, which insures absolute rigidity thereof. These cross-bars are not shown in the drawings.

In Fig. 2 the driving-wheel on the left-hand side has been removed to facilitate the reading of the drawings.

The advantages of my arrangement are as follows:

First. The realization of a stability analogous to that of a vehicle with two wheels, which was not capable of being realized with a type of vehicle having four wheels consisting of two pairs, each pair being mounted on the same axis.

Second. Better efficiency of the motor. The center of gravity of the whole system being arranged in rear of the driving-wheels, the motor draws instead of propels. Moreover, a motor working in this manner yields twenty per cent. more than a motor working by propulsion. Its arrangement in front of the vehicle consequently in a full current of air insures a better cooling for it, which renders it possible to employ, for example, a spirit-motor cooled by vanes, which is always less expansive than one with water circulation, the latter being always of considerable weight and bulky.

Third. Possibility of moving the steering organs without any inconvenience either to the passengers or to the driver, which is a real advantage for either a public or a private vehicle.

Fourth. Possibility of reducing to a minimum the air resistance by giving to the whole the form of a double cone having a height equal to double the width of the body of the vehicle taken at the height of the center of gravity and at the rear a cone of height equal to this width, the vehicle in motion thus not being capable of drawing or carrying air behind it.

I claim—

In a motor-vehicle, the combination with the frame, of steering-wheels arranged at the front and rear of said frame, rotary forks connected to the axles of said wheels and having pin-and-slot connections with the frame, sectors carried by said forks and chains acting upon said sectors for simultaneously turning the forks, substantially as described.

The foregoing specification of my improvements in steering-gear for motor-vehicles signed by me this 1st day of March, 1901.

HENRY RENÉ MARIE CORMERY.

Witnesses:
EDWARD P. MACLEAN,
MAURICE H. PIGNET.